US010303461B2

(12) United States Patent
Fuglsang et al.

(10) Patent No.: US 10,303,461 B2
(45) Date of Patent: May 28, 2019

(54) COMPOSITE INSTANCE PATCHING

(71) Applicant: ORACLE INTERNATIONAL CORPORATION, Redwood Shores, CA (US)

(72) Inventors: Dennis Fuglsang, Ballwin, MO (US); Yogesh Kumar, Sunnyvale, CA (US); Aninda Sengupta, Redwood City, CA (US); Rajeev Kumar Misra, Foster City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 15/268,408

(22) Filed: Sep. 16, 2016

(65) Prior Publication Data

US 2017/0090912 A1 Mar. 30, 2017

Related U.S. Application Data

(60) Provisional application No. 62/235,307, filed on Sep. 30, 2015.

(51) Int. Cl.

| | |
|---|---|
| ***G06F 8/30*** | (2018.01) |
| ***G06F 8/65*** | (2018.01) |
| ***G06F 11/14*** | (2006.01) |
| ***G06F 8/656*** | (2018.01) |

(52) U.S. Cl.

CPC ................ *G06F 8/656* (2018.02); *G06F 8/30* (2013.01); *G06F 8/65* (2013.01); *G06F 11/1433* (2013.01); *G06F 2212/402* (2013.01)

(58) Field of Classification Search

CPC ..... G06F 8/65; G06F 8/67; G06F 8/30; G06F 11/1433; G06F 2212/402

USPC ........................................ 717/168, 172, 173

See application file for complete search history.

(56) References Cited

U.S. PATENT DOCUMENTS 6,976,079 B1 * 12/2005 Ferguson .................. G06F 8/65 709/203
8,869,108 B2 * 10/2014 Utschig-Utschig ....... G06F 8/71 717/118
2002/0013791 A1 * 1/2002 Niazi ................ G06F 17/30569 715/240
2003/0120873 A1 * 6/2003 Kanaley ............ G06F 17/30371 711/141
2004/0261053 A1 * 12/2004 Dougherty ................ G06F 8/20 717/101

(Continued)

OTHER PUBLICATIONS

Oracle, “5 Introduction to Interaction Patterns in a BPEL Process” 2012.*

*Primary Examiner* — Phillip H Nguyen
(74) *Attorney, Agent, or Firm* — Kilpatrick Townsend & Stockton LLP

(57) ABSTRACT

Methods and systems for patching an instance of a composite executing in a runtime environment are provided. A method can include at a computer system comprising a processor and a memory executing, by an application server, one or more instances of a composite, and enabling a patch to be applied to the one or more instances of the composite without stopping execution of the one or more instances in the application server, wherein the patch comprises one or more changes to be made to the composite.

21 Claims, 13 Drawing Sheets

(56) References Cited

U.S. PATENT DOCUMENTS

| | | | | |
|---|---|---|---|---|
| 2005/0144616 | A1* | 6/2005 | Hammond | G06F 8/65<br>717/173 |
| 2007/0016615 | A1* | 1/2007 | Mohan | G06F 8/20 |
| 2007/0282800 | A1* | 12/2007 | England | G06F 21/604 |
| 2009/0259999 | A1* | 10/2009 | Srinivasan | G06F 8/62<br>717/170 |

* cited by examiner

310

```
<?xml version = '1.0' encoding = 'UTF-8'?>
<!--
////////////////////////////////////////////////////////////////////////////////////////////////////////////////////////////////////////////
 Oracle JDeveloper BPEL Designer

 Created: Fri Aug 24 22:10:49 PDT 2007
 Author: gsah
 Purpose: Synchronous BPEL Process
////////////////////////////////////////////////////////////////////////////////////////////////////////////////////////////////////////////
-->
<process name="HelloWorld" targetNamespace="http://xmlns.oracle.com/HelloWorldApp/HelloWorld/HelloWorld" xmlns="http://
schemas.xmlsoap.org/ws/2003/03/business-process/" xmlns:client="http://xmlns.oracle.com/HelloWorldApp/HelloWorld/HelloWorld"
xmlns:ora="http://schemas.oracle.com/xpath/extension" xmlns:orcl="http://www.oracle.com/XSL/Transform/java/
oracle.tip.pc.services.functions.ExtFunc" xmlns:xp20="http://www.oracle.com/XSL/Transform/java/oracle.tip.pc.services.functions.Xpath20"
xmlns:ldap="http://schemas.oracle.com/xpath/extension/ldap" xmlns:bpelx="http://schemas.oracle.com/bpel/extension" xmlns:bpws="http://
schemas.xmlsoap.org/ws/2003/03/business-process/">

 <!--
  ////////////////////////////////////////////////////////////////////////////////////////////////////////////////////////////////////////////
   PARTNERLINKS
   List of services participating in this BPEL process
  ////////////////////////////////////////////////////////////////////////////////////////////////////////////////////////////////////////////
 -->
 <partnerLinks>
  <!--
   The 'client' role represents the requester of this service. It is
   used for callback. The location and correlation information associated
   with the client role are automatically set using WS-Addressing.
  -->
  <partnerLink name="client" partnerLinkType="client:HelloWorld" myRole="HelloWorldProvider"/>
 </partnerLinks>

 <!--
  ////////////////////////////////////////////////////////////////////////////////////////////////////////////////////////////////////////////
   VARIABLES
   List of messages and XML documents used within this BPEL process
  ////////////////////////////////////////////////////////////////////////////////////////////////////////////////////////////////////////////
 -->
 <variables>
  <!-- Reference to the message passed as input during initiation -->
  <variable name="inputVariable" messageType="client:HelloWorldRequestMessage"/>

  <!-- Reference to the message that will be returned to the requester-->
  <variable name="outputVariable" messageType="client:HelloWorldResponseMessage"/>
 </variables>

 <!--
  ////////////////////////////////////////////////////////////////////////////////////////////////////////////////////////////////////////////
  ORCHESTRATION LOGIC
  Set of activities coordinating the flow of messages across the
  services integrated within this business process
  ////////////////////////////////////////////////////////////////////////////////////////////////////////////////////////////////////////////
 -->
 <sequence name="main">

  <!-- Receive input from requestor. (Note: This maps to operation defined in HelloWorld.wsdl) -->
  <receive name="receiveInput" partnerLink="client" portType="client:HelloWorld" operation="process" variable="inputVariable"
createInstance="yes"/>

  <wait name="Wait1" for="'PT30S'"/>

  <!-- Generate reply to synchronous request -->
  <assign name="Assign_1">
   <copy>
    <from expression="concat('Hello ',bpws:getVariableData('inputVariable','payload','/client:HelloWorldProcessRequest/client:input'))"/>
    <to variable="outputVariable" part="payload" query="/client:HelloWorldProcessResponse/client:result"/>
   </copy>
  </assign>
  <reply name="replyOutput" partnerLink="client" portType="client:HelloWorld" operation="process" variable="outputVariable"/>
 </sequence>
</process>
```

```
<?xml version="1.0" encoding="ISO-8859-1"?>
<xsl:stylesheet xmlns:xsl="http://www.w3.org/1999/XSL/Transform"
xmlns:bpws="http://schemas.xmlsoap.org/ws/2003/03/business-process/"
xmlns:bpelx="http://schemas.oracle.com/bpel/extension" version="2.0">
      <xsl:output method="xml"/>
   -  <xsl:template match="//bpws:variables/* | //bpws:receive | //bpws:onMessage | //bpws:onAlarm
      | //bpws:wait | //bpelx:dehydrate | //bpelx:exec">
        -  <xsl:copy>
                <xsl:apply-templates select="@*"/>
           </xsl:copy>
      </xsl:template>
   +  <xsl:template match="@*">
      <xsl:template match="text()"/>
</xsl:stylesheet>
```

```
<variable xmlns="http://schemas.xmlsoap.org/ws/2003/03/business-process/"
xmlns:bpelx="http://schemas.oracle.com/bpel/extension" xmlns:bpws="http://
schemas.xmlsoap.org/ws/2003/03/business-process/" xmlns:orcl="http://
www.oracle.com/XSL/Transform/java/oracle.tip.pc.services.functions.ExtFunc"
xmlns:client="http://xmlns.oracle.com/HelloWorldApp/HelloWorld/HelloWorld"
xmlns:xp20="http://www.oracle.com/XSL/Transform/java/
oracle.tip.pc.services.functions.Xpath20" xmlns:ldap="http://schemas.oracle.com/xpath/
extension/ldap" xmlns:ora="http://schemas.oracle.com/xpath/extension"
name="inputVariable" messageType="client:HelloWorldRequestMessage"/>

<variable xmlns="http://schemas.xmlsoap.org/ws/2003/03/business-process/"
xmlns:bpelx="http://schemas.oracle.com/bpel/extension" xmlns:bpws="http://
schemas.xmlsoap.org/ws/2003/03/business-process/" xmlns:orcl="http://
www.oracle.com/XSL/Transform/java/oracle.tip.pc.services.functions.ExtFunc"
xmlns:client="http://xmlns.oracle.com/HelloWorldApp/HelloWorld/HelloWorld"
xmlns:xp20="http://www.oracle.com/XSL/Transform/java/
oracle.tip.pc.services.functions.Xpath20" xmlns:ldap="http://schemas.oracle.com/xpath/
extension/ldap" xmlns:ora="http://schemas.oracle.com/xpath/extension"
name="outputVariable" messageType="client:HelloWorldResponseMessage"/>

<receive xmlns="http://schemas.xmlsoap.org/ws/2003/03/business-process/"
xmlns:bpelx="http://schemas.oracle.com/bpel/extension" xmlns:bpws="http://
schemas.xmlsoap.org/ws/2003/03/business-process/" xmlns:orcl="http://
www.oracle.com/XSL/Transform/java/oracle.tip.pc.services.functions.ExtFunc"
xmlns:client="http://xmlns.oracle.com/HelloWorldApp/HelloWorld/HelloWorld"
xmlns:xp20="http://www.oracle.com/XSL/Transform/java/
oracle.tip.pc.services.functions.Xpath20" xmlns:ldap="http://schemas.oracle.com/xpath/
extension/ldap" xmlns:ora="http://schemas.oracle.com/xpath/extension"
name="receiveInput" partnerLink="client" portType="client:HelloWorld"
operation="process" variable="inputVariable" createInstance="yes"/>

<wait xmlns="http://schemas.xmlsoap.org/ws/2003/03/business-process/"
xmlns:bpelx="http://schemas.oracle.com/bpel/extension" xmlns:bpws="http://
schemas.xmlsoap.org/ws/2003/03/business-process/" xmlns:orcl="http://
www.oracle.com/XSL/Transform/java/oracle.tip.pc.services.functions.ExtFunc"
xmlns:client="http://xmlns.oracle.com/HelloWorldApp/HelloWorld/HelloWorld"
xmlns:xp20="http://www.oracle.com/XSL/Transform/java/
oracle.tip.pc.services.functions.Xpath20" xmlns:ldap="http://schemas.oracle.com/xpath/
extension/ldap" xmlns:ora="http://schemas.oracle.com/xpath/extension" name="Wait1"
for="'PT30S'"/>
```

```
<!-- Patch compatibility validators registration -->
<bean id="PatchCompatibilityValidators"
    class="oracle.integration.platform.blocks.deploy.patch.PatchCompatibilityValidators" scope="prototype">
    <constructor-arg>
        <list>
            <ref bean="bpelPatchCompatibilityValidator"/>
            <ref bean="adapterPatchCompatibilityValidator"/>
        </list>
    </constructor-arg>
</bean>
<bean id="bpelPatchCompatibilityValidator"
    class="com.collaxa.cube.lang.compiler.BPELPatchCompatibilityValidator"/>
<bean id="adapterPatchCompatibilityValidator"
    class="oracle.integration.platform.blocks.adapter.fw.metadata.AdapterPatchCompatibilityValidator"/>
```

COMPOSITE INSTANCE PATCHING

CROSS-REFERENCE TO RELATED APPLICATION

This application is a non-provisional application and claims the benefit and priority of U.S. Provisional Application No. 62/235,307, filed on Sep. 30, 2015 titled "ZDT COMPOSITE PATCHING," which is herein incorporated by reference in its entirety for all purposes.

FIELD

The present disclosure generally relates to a system and method for supporting zero down time (ZDT) patching of an instance of a running composite.

BACKGROUND

Service-Oriented Architecture (SOA) is used to facilitate the interaction between software components on computers connected over a network, such as a cloud-based network. Functions from enterprise applications are separated into interoperable, standards-based services, which can then be combined with other services and reused to meet particular business needs. Thus, using SOA, functionality provided by applications (from potentially multiple vendors) can be integrated as one or more services, and orchestrated into new composite applications or composites. Composites can contain both new services created specifically for the application and also a business function from existing systems and applications, reused as part of the composition.

SOA enables business objectives while building an enterprise quality system. SOA includes a collection of standards and practices including service component architecture (SCA). SCA is a set of specifications which describe a model for building applications and systems using an SOA. SCA provides a model for the composition of services and for the creation of service components, including the reuse of an existing application function within SCA compositions. SCA extends and complements approaches to implementing services, and SCA builds on open standards, such as Web services. By using SCA, a business function is provided as a series of services that are assembled together to create solutions that serve a particular business need.

SOA can be implemented in an SOA middleware container (e.g. SOA Suite). A container is, for example, a program, such as a Java program which is capable of running other programs. A container can be, for example, a run-time engine. The SOA container can store applications, such as fusion and non-fusion applications. Fusion applications are targeted applications for different industries (e.g., financial, accounting, customer service, supply chain, etc.). Fusion applications are pre-built applications which can be customized for businesses.

The services can be orchestrated using orchestration capabilities like Business Process Execution Language (BPEL) or business process management (BPM). BPEL is an XML-based language that allows Web services in a service-oriented architecture (SOA) to interconnect and share data. BPM is a field in operations management that manages processes in order to improve business performance outcomes. A company's performance can be improved by managing and optimizing a company's business processes. Composites can be developed to support an organization's business processes.

A composite can be running in, for example, a SOA container, when a user determines that changes to the composite need to be made. For example, a user may need to fix a bug, such as an error, flaw, or failure in the composite application, which will affect the composite that is running. However, in order to change the composite, a new version of the composite is created. Further, in order to deploy the new version of the composite, all instances of the composite have to be stopped. Since the instances may be stopped mid-operation, this can affect the results of the composite or the results may be inaccurate.

Alternatively, instead of stopping the composite, the one or more instances of the composite can continue to run until they have completed their process and the changes can be deployed the next time the service, to which the composite is directed, is called. Therefore, the changes would not become effective until the next time a service is called. However, a lot of data can be affected if a composite is not updated or fixed immediately. Also, a composite can run for a long time and it can be days, weeks or years before an instance of a composite has completed running. Any delays can affect a user's business and it can be a lengthy amount of time before changes can be made.

Therefore, a method of patching a running composite is desired.

SUMMARY

Systems, methods and computer-readable memory for patching an instance of a composite executing in a runtime environment are described.

According to an exemplary embodiment, a method can include at a computer system comprising a processor and a memory executing, by an application server, one or more instances of a composite, and enabling a patch to be applied to the one or more instances of the composite without stopping execution of the one or more instances in the application server, wherein the patch comprises one or more changes to be made to the composite.

According to an exemplary embodiment, a system can include an application server configured to execute one or more instances of a composite, and enable a patch to be applied to the one or more instances of the composite without stopping execution of the one or more instances, wherein the patch comprises one or more changes to be made to the composite.

According to an exemplary embodiment, a computer-readable memory can include a set of instructions stored therein which, when executed by a processor, causes the processor to execute one or more instances of a composite in an application server, and enable a patch to be applied to the one or more instances of the composite without stopping execution of the one or more instances in the application server, wherein the patch comprises one or more changes to be made to the composite.

The foregoing, together with other features and exemplary embodiments, will be described in more detail below.

BRIEF DESCRIPTION OF THE DRAWINGS

The disclosure will be readily understood by the following detailed description in conjunction with the accompanying drawings, wherein like reference numerals designate like elements, and in which:

FIGS. 3A, 3B and 3C illustrate example composite artifacts, in accordance with some exemplary embodiments.

FIG. 7 illustrates the registration of patch compatibility validators used during a validation check, in accordance with some exemplary embodiments.

DETAILED DESCRIPTION

Figure 1:
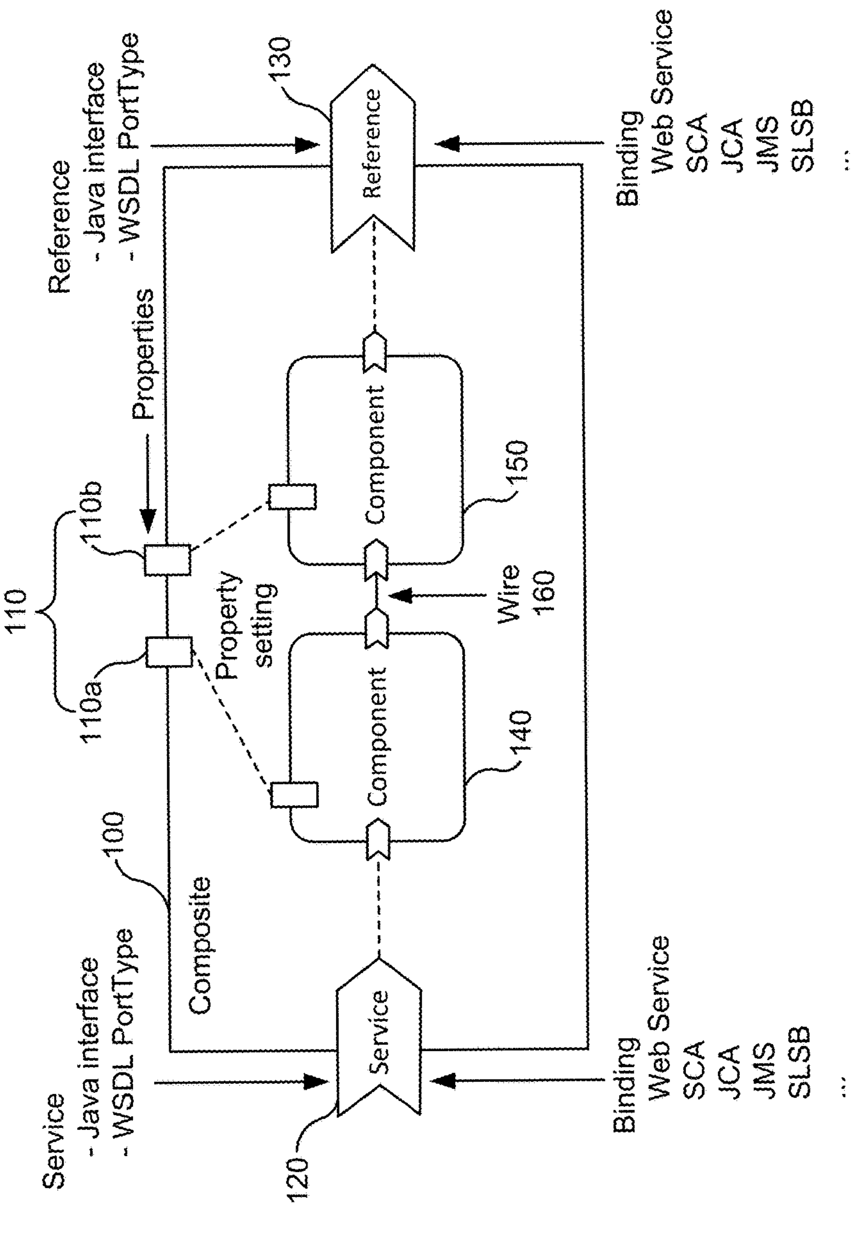
FIG. 1 illustrates a composite, in accordance with some exemplary embodiments.

In the following description, for the purposes of explanation, specific details are set forth in order to provide a thorough understanding of the exemplary embodiments. However, it will be apparent that various embodiments may be practiced without these specific details. The figures and description are not intended to be restrictive.

Application servers generally provide a managed environment within which software applications can be deployed and run. Cloud-based environments allow applications to run within and take advantage of the distributed resources provided by a cloud. In accordance with some exemplary embodiments, described herein is a system and method for patching a composite in an application server, cloud, on-premise, or other environment, which enables composites to be changed while the composite is running.

The composite can be running in an application server, such as a WebLogic server, of a SOA middleware container. The SOA middleware container is a flexible integration framework and can be, for example, SOA Suite. The SOA middleware container integrates heterogeneous systems. For example, if a company would like to integrate two systems, such as a travel reservation system (e.g. Semi-automated Business Research Environment (SABRE)) and a back end database, to communicate with each other, the SOA middleware container sits between these two systems. The two systems communicate with each other through the use of one or more composite applications which is interpreted by the SOA middleware container.

The SOA middleware container is a program which runs other programs and is, for example, a run-time engine. The SOA middleware container executes or interprets artifacts, such as artifacts which make up a composite application.

An exemplary embodiment provides the capability of making changes or fixes to all instances, including new and currently running instances, of a composite in the server. If a user, such as a developer in the IT department of a company, would like to fix a bug which exists on a running composite, in accordance with some exemplary embodiments, the user can create and deploy the changes to the running composite.

For example, a company may be running a composite directed to expense reporting. However, there may be a bug in the instance of the composite that is running. The bug may cause the instance of the composite to incorrectly handle currency conversions. The data mapping may be incorrectly mapping one currency format to another currency format. Therefore, an exemplary embodiment provides a user with the capability of modifying and creating a patch to the mapping to thereby fix the bug in the application logic.

Expense reports that were submitted prior to the patch can be corrected and patched and do not need to be resubmitted. Expense reports submitted prior to the patch and which contain an error, can be identified and resubmitted. Therefore, all expenses reports prior to the patch do not need to be resubmitted for correction. Further, expense reports which have already been submitted, but have not reached the point where the error occur in the composite, can be automatically corrected since the changes to the composite will be automatically performed.

The example described above is directed to expense reports, however, this is merely an example. The exemplary embodiments can be directed to composites for different business applications.

I. Composite

A composite, also known as composite application or an integration application, is an application that can be made up of one or more components from multiple and/or different parts. A composite application can be built up out of other composite applications.

A composite application can be an assembly of services, service components, and references designed and deployed together in a single application. Wiring between the service, service component, and reference enables message communication. The composite application processes the information described in the messages.

A composite application can be directed to, for example, determining credit ratings or obtaining stock quotes. Composite applications can be directed to performing various operations and Obtaining different types of data. Further, a composite application can be written in, for example, Extensible Markup Language (XML).

A composite application can be written according to the service component architecture (SCA) specification. The SCA specification defines how various enterprise pieces are created and assembled together as modular components to increase IT sustainability and flexibility. The composite applications are written in high level languages, such as Business Process Execution Language (BPEL) or business process management (BPM), and the SOA middleware container interprets and runs the high level languages. The users, such as businesses and companies, can program the SOA middle container using a graphical environment.

A composite can include definitions which are defined through one or more artifacts. An artifact can include a set of files which are bundled together to form an archive, such as a Java archive (JAR). The JAR can be deployed in the server as part of the patching activity. A JAR can be on a per composite basis. That is, the JAR including the artifacts can correspond to a single composite.

FIG. 1 illustrates a composite, in accordance with some exemplary embodiments. As shown in FIG. 1, the composite 100 includes properties 110, service 120, reference 130, component 140, component 150 and wire 160.

The composite 100 is the main unit of deployment and can include one or more components 140 and 150. The composite 100 can be created using, for example, JDeveloper which is a graphical modeling tool. JDeveloper is an integrated development environment that simplifies the development of Java-based SOA and Java EE applications. JDeveloper includes a set of modeling capabilities for building up composites.

Components 140 and 150 provide logic which can be used within composite 100. Components 140 and 150 can each provide an atomic portion of a business functionality. Two components are shown in FIG. 1, however, the exemplary embodiments are not limited to two components. The composite 100 can include one component or more than one component.

Components 140 and 150 can be wired together via wire 160 into composite 100. Components 140 and 150 can include properties 110 specific to each component. Properties 110 allow for customization of a component's behavior for a particular deployment. For example, component 140 can include properties 110*a* and component 150 can include properties 110*b*.

Components such a s BPEL, business rules, web services, human tasks, and mediators, can be included in the JDeveloper integrated development environment (IDE). That is, service components can include BPEL processes which provide process orchestration and storage of synchronous or asynchronous process, business rules which enable a user to design a business decision based on rules, human tasks which provide workflow modeling that describes the tasks for users or groups to perform as part of an end-to-end business process flow, and mediators which route events (messages) between different components.

The metadata that describes the components 140 and 150 in composite 100 can be unified in a composite file and deployed to a Metadata Store (MDS). The MDS backs the composite application at design-time and runtime.

Components 140 and 150 can each be directed to performing a particular task or set of tasks. Components 140 and 150 offer their functions as services, and can either be used by other components within the same module (e.g., composite 100) or can be made available for use outside of the module through entry points. Component 140 may depend on services provided by other components, such as component 150. For example, component 140 can be directed to determining a person's credit card history and component 150 can be directed to allowing a person to apply for a loan based on the credit card history that is determined in component 140.

Each service component is hosted in its own service engine container. Messages sent to the service engine are targeted at specific service components. For example, a message targeted for a BPEL process is sent to the BPEL service engine.

The service 120 exposes components 140 and 150. The service 120 can expose component 140 and component 150 through, for example, an application programming interface (API). Service 120 exposes a chain of one or more components, such as component 140 and component 150. The service 120 can also act as the entry point to the composite. Services that are exposed by a component and are callable from outside of the composite are promoted services. A service can include, for example, a credit rating service, a billing service, or any kind of service where information would be obtained.

Services provide the outside world with an entry point to the SOA composite application. Services are advertised externally. Service 120 can refer to, for example, a service such as a JAVA interface or a Web Service Definition Language (WSDL) Port Type. The WSDL file of the service advertises its capabilities to external applications. Service 120 can also refer to, for example, a binding service, such as a web service, Service Component Architecture (SCA), J2EE Connector Architecture (JCA), Java Message Service (JMS), Stateless Session Bean (SLSB). The binding service or connectivity of the service describes the protocols that can communicate with the service, for example, SOAP/HTTP or a JCA adapter. Reference 130 can refer to a reference such as a JAVA interface or a WSDL Port Type. Reference 130 can also refer to a binding reference such as a web service, SCA, JCA, JMS, SLSB.

There can also be a reference 130 to other services which are calling the component. The references can also be known as dependencies. The reference 130 may be local or remote and may refer to internal or external services. References can either be linked to services provided by, for example, components 140 and 150 that are in the same composite 100, or references can be linked to services provided outside of the composite 100, which potentially can be provided by another composite. References can enable messages to be sent from the SOA composite application to external services in the outside world.

Components 140 and 150 are linked together as dependencies or references through wire 160. Wire 160 connects component 140 and component 150. A single wire 160 is shown in FIG. 1, however, this is merely exemplary. If, for example, three components are included in a composite then two or more wires may be used.

A wire can also act as a link between references and services, such as, reference 130 and service 120. Wires enable a user to graphically connect components (e.g. services to service components, service components to other service components, service components to reference) in a single SOA composite application for message communication.

Composites with different scopes can be combined in an SOA container. Although a single composite is shown in FIG. 1, several composites can be used. For example, several composite applications may be used and orchestrated in order to perform a business process.

A composite can be deployed in a server, such as in a WebLogic server, of a SOA container.

II. Service Oriented Architecture (SOA) Environment

Figure 2:
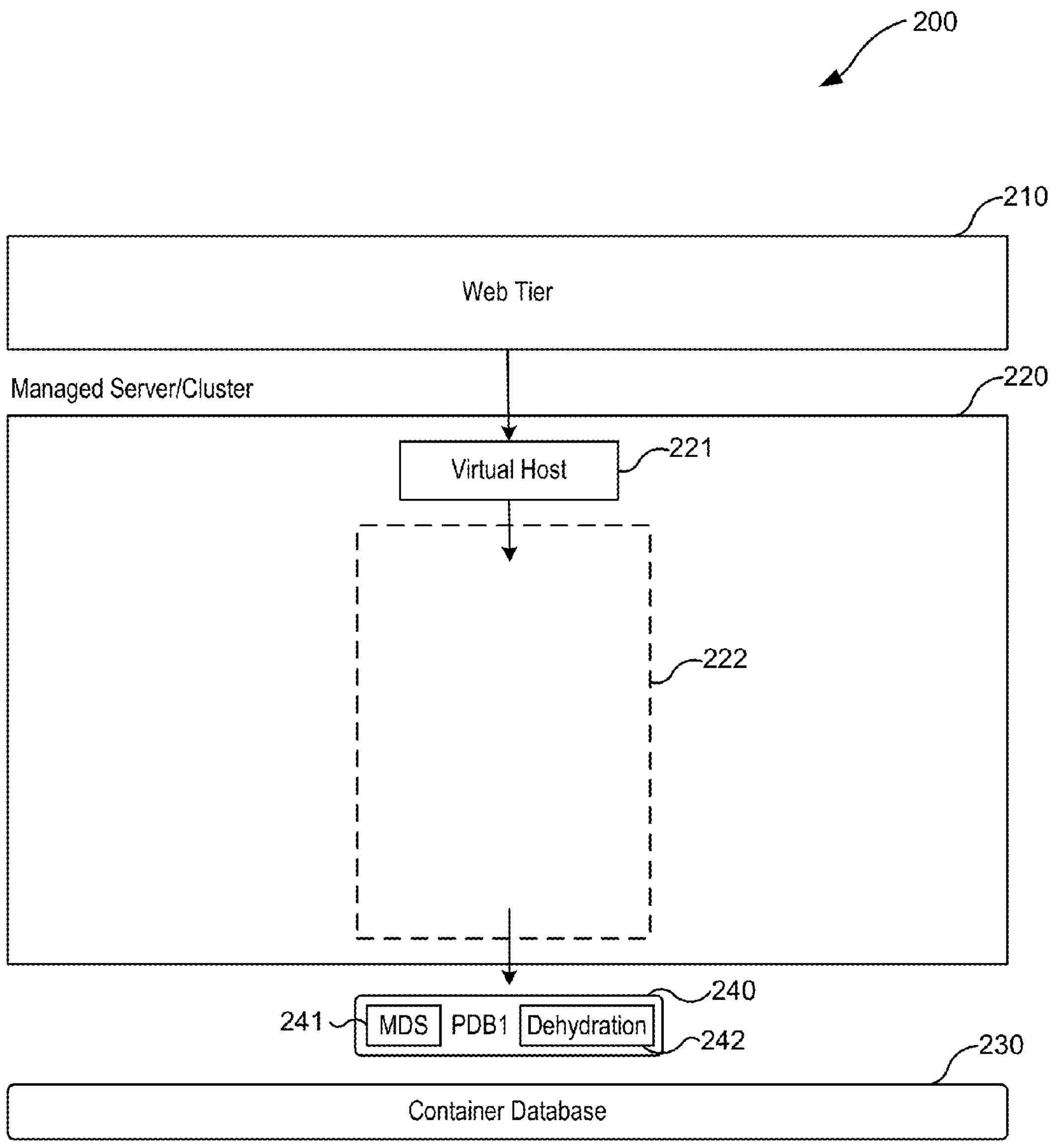
FIG. 2 illustrates a Service Oriented Architecture (SOA) environment, in accordance with some exemplary embodiments.

FIG. 2 illustrates a SOA environment, in accordance with some exemplary embodiments. As shown in FIG. 2, a SOA environment 200 includes a web tier 210, a server 220 and a container database 230. Web tier 210 is, for example, a load balancer. The web tier can use, for example, an Oracle® HTTP Server (OHS).

Server 220 can be, for example, a WebLogic Server (WLS) and a composite can be deployed in the server 220. The server 220 can include a virtual host 221 which can be used to communicate with a tenant's partition 222. Specifically, the server 220 can expose virtual host 221. Therefore, if requests are received, the requests can be routed by the virtual hosts 221 to the appropriate partition. Requests can be routed to the correct partition based on, for example, a uniform resource locator (URL).

A partition can also be known as a folder. A partition is a virtual server of a tenant. A tenant is a user or a group of users who share a common access with specific privileges to the software instance. For example, a tenant can be a company or a business. Although a single partition is shown in FIG. 2, there can be more than one partition and the one or more partitions can belong to one or more customers.

The container database 230 can include one or more databases, such as database 240. Database 240 can be, for example, a pluggable database. A pluggable database will allow multiple databases to run under one copy, or instance, of the database software. Although a single database is shown in FIG. 2 there can be more than one database. Further, if there is more than one partition, each partition can have a corresponding database.

Metadata can be customized for each tenant and stored separately for each tenant in their respective database. Metadata of one or more composite applications for a tenant can be stored in database 240 which corresponds to the partition 222 of the tenant. The metadata stored in database 240 can include for example, metadata regarding one or more composite applications of the tenant.

Metadata services (MDS) can be used for storing the metadata. MDS provides a unified store for metadata and can ensure consistent and reliable access to the metadata. MDS can include, for example, the services and processes for storing data in a database. For example, MDS 241 can be used as a service for storage and management of metadata in database 240. The MDS can assemble artifacts and is used in the storage of metadata.

As shown in FIG. 2, database 240 can include dehydration 242. Dehydration 242 can store information about long running processes, such as business processes. For example, over the life cycle of a BPEL instance, the instance with its current state of execution can be saved in the dehydration. Therefore, the dehydration can store BPEL instances.

Partition 222 can include, for example, a Java application for implementing the SOA container in the server 220. For example, partition 222 can include SOA infrastructure data, definitions for a Java Message Service (JMS), definitions for J2EE Connector Architecture (JCA) factories, and definitions for datasources for a Java Naming and Directory Interface (JNDI) environment.

The JMS definitions provide a way for Java programs, which make up the SOA container, to access, for example, enterprise messaging systems. JCA factories can include, for example, definitions for JCA adapters. The definitions for the datasources can include definitions for configuring an application, such as a Java application, to point to a particular database.

Adapters adapt data going into and out of applications and allows a user to interface with other systems. Therefore, information can be adapted according to the application that is running. Adapters support a robust, light weight, highly scalable, and standards-based integration framework, which enables disparate applications to communicate with each other. For example, adapters enable you to integrate packaged applications, legacy applications, databases, and Web services.

Integration adapters can be plugged into a system in order to communicate with different systems. The adapters provide a unified connectivity architecture, which facilitates integration of information from several on-premise, legacy and cloud based applications and systems into the SOA communication middleware. There are adapters for different web services, legacy systems, input (e.g. main frames), external systems. The adapters facilitate integration and are an extension platform for applications. Some adapters can be preconfigured and some adapters can be customized. The adapters are a component of the SOA middleware container and can be used to communicate with an external system.

When a tenant of partition 222 executes a process, such as a business process, during runtime of the server 220, artifacts which make up the composite application would be deployed. For example, a JAR including artifacts can be deployed in the application server. During deployment, the artifacts can be unzipped, read and instantiated as in-memory running objects. When the artifacts are deployed in the application server, the metadata which makes up the artifacts can be uploaded with the SOA container. When a service to which the composite is direct is invoked, an instance of the composite can be created in the runtime.

III. Patchable Components

Changes or patches can be made for various types of components. The changes or patches that can be made can be determined by, for example, a provider of the SOA container.

Changes can be performed for, for example, Extensible Stylesheet Language Transformation (XSLT), fault policy, sensor data, analytics and measurement data. Changes which can be made to a composite can include changes to composite sensors, monitors, security policies and token values in composite .xml references.

Changes can also be made for adapters, such as property changes in configuration files. Adapters that can be patched can include, for example, file, file transfer protocol (FTP), database, message queue (MQ), coherence, access queue (AQ), Business Activity Monitoring (BAM) 11 g, Java Message Service (JMS), JD Edwards (JDE) world, docket, Microsoft Message Queueing (MSMQ), User Messaging Service (UMS) and Lightweight Directory Access Protocol (LDAP) adapters.

Changes can also be made for Business Process Execution Language (BPEL) which is the XML-based language used for the SOA container. Changes which can be made for BPEL can include, atomic activities, sync invoke, async invoke, changes to sensors, monitors, and fault policies.

For example, a provider can configure patches for a BPEL as being compatible with the composite. BPEL can act as a state machine. When a BPEL process moves between a first state and a second state, the first and second state are stored in a database as a dehydration point. During the movement between states, there are transient aspects of the BPEL which are not stored as part of the state of the BPEL instance. A user can make changes to the transient aspects since this will not affect the instance of the composite. However, a user would not be able to make changes to the states which are stored at dehydration points, since this would affect the instance of the composite. Therefore, the provider can allow changes to be made to BPEL that are in a transient state but will not allow changes to BPEL data that are in a dehydration point.

The dehydration points can represent activities in a BPEL process flow, such as wait activities or call back activities. A wait activity can include waiting for a particular interval of time, such as five or ten minutes. If a BPEL process represents a mortgage application and a customer has submitted a mortgage application, then the activity can represent waiting for a response from a bank regarding the mortgage application.

During that point in time where the customer is waiting for a response from the bank, the state of that instance is saved in a database and specifically in the dehydration store. A user of the system should not modify activities in the dehydration store. If a user were to modify the activity which is at a dehydration point, when the call back or response from the bank arrives, and the system would like to change the state of the BPEL process, the state cannot be correctly changed due to the modifications made to the state.

FIGS. 3A, 3B and 3C illustrate example composite artifacts or documents, in accordance with some exemplary embodiments. FIG. 3A illustrates an example of a BPEL document 310, FIG. 3B illustrates an example XSLT document 320 which can be applied to the BPEL document of FIG. 3A, and FIG. 3C illustrates an example BPEL document 330 after the XSLT document 320 has been applied to the BPEL document 310 of FIG. 3A.

A provider of the SOA container may generate, for example, a BPEL document 310 as shown in FIG. 3A. The BPEL document as shown in FIG. 3A includes data of a composite that may be changed by a user. However, certain aspects of a composite should not be modified. FIG. 3B illustrates an XSLT document 320. An XSLT document that is modified as part of a composite instance patch can be bundled up into a patch archive and deployed thereby overwriting the originally deployed XSLT document.

The JDeveloper modeling tool, when in the SOA Patch Developer role, restricts the user through its GUI menu actions, dialogs, editors and wizards to changing only those properties within a composite definition that are deemed as compatible with composite instance patching. In a side-by-side comparison of the resulting patch artifacts against the originals, the only differences are in the values of the updated properties. The patch is only composed of edited versions of the original artifacts along with a patch.xml file that is a manifest of the patch contents.

If an activity has been removed from BPEL document 310, then the changes are not compatible and the changes should not be made to the composite. For example, the XSLT document 320 can be used to determine if dehydration points, which should not be removed, have been removed. Any transient activities, such as activities which occur between the dehydration states, can be modified. A filtered version of the BPEL document, as shown in FIG. 3C is then provided. The final BPEL document 330 includes changes which can be made to a running composite.

Therefore, before a user can make changes to a composite, a provider can determine the types of changes that will be compatible, such as that which is identified on an XSLT document. A programming tool can be configured so that only valid and compatible changes to a process are made. For example, programming tools such as JDeveloper, Application Programming Interface (API) and WebLogic Scripting Tool (WLST) can be configured so that only valid changes are made to a composite.

Since only patches which are compatible with the system can be performed, the patch that is created will not introduce any problems or errors to the currently running composite. Therefore, data or other business critical information will not be corrupted.

The examples described above of compatible changes are merely examples. The exemplary embodiments are not limited to these examples. The changes which can be made when creating a patch can include fewer or more types as designated by, for example, a provider of the SOA container.

IV. Method of Creating a Patch for a Running Composite

Figure 4:
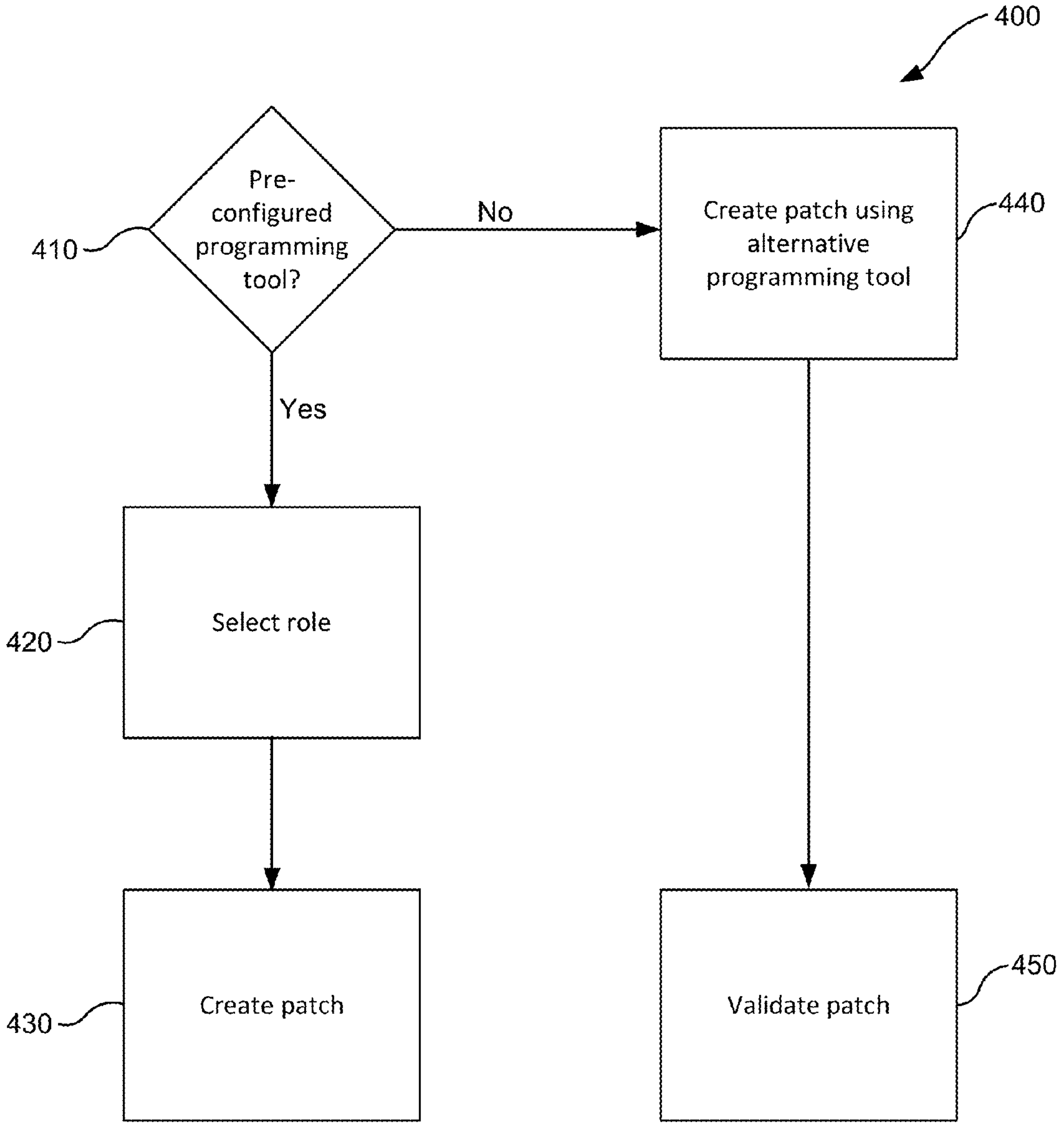
FIG. 4 is a flowchart of a method of creating a patch for a running composite, in accordance with some exemplary embodiments.

FIG. 4 is a flowchart of a method of creating a patch for a running composite, in accordance with some exemplary embodiments.

FIG. 4 illustrates a method 400 of creating a patch for a composite which is running in the server. A patch can be used to create changes to a running composite to, for example, fix a bug on the composite. The changes can be made while the composite is currently running and the composite application does not need to be stopped or completed before changes or patches can be made.

At step 410, it is determined whether the user is operating a pre-configured programming tool, such as JDeveloper. The programming tool is a pre-configured programming tool if it has been designed to permit only compatible patching. The pre-configured programming tool can be designed by, for example, a provider of the SOA container. Although JDeveloper is used as an example of a programming tool for creating a patch, other programs can be used to create a patch to the composite.

If the user is not running a pre-configured programming tool, at step 440, the user can create the patch using the user designated programming tool. After creating the patch at step 440, the patch is validated at step 450. Since the patch was created using a tool that is not a pre-configured programming tool, the user may have created a patch that will cause errors with the composite that is running. Therefore, if a user uses a tool other than a prefigured programming tool, then a validation can be performed during design of the patch. That is, validation can be performed during design time of the patch to determine that the patch is valid and compatible with the composite.

If the user is running a pre-configured programming tool, at step 420, the user can select a role for creating a patch. The user can be prompted to select a role when the user initially loads the programming tool.

Figure 5:
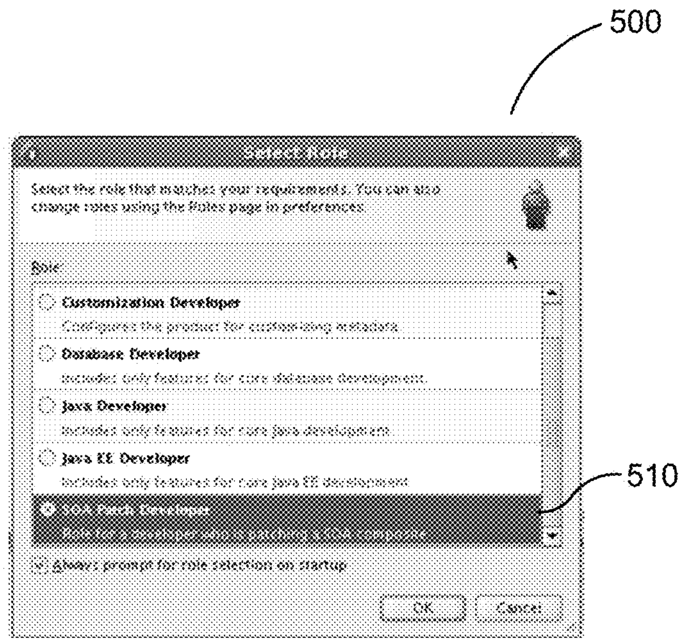
FIG. 5 illustrates a user-interface for role selection, in accordance with some exemplary embodiments.

FIG. 5 illustrates a user-interface for role selection, in accordance with some exemplary embodiments. As shown in FIG. 5, a user can be provided with an interface 400 on a pre-configured programming tool. The interface 500 can include several roles which are available for a user. A role can define functionalities that are exposed to a user. If the user selects the patch developer role 510, then the user can create a patch for the composite. For example, when the user selects the patch developer role 510, then the program can enter a patch mode. That is the program enters a mode for creating a patch.

The pre-configured programming tool can be configured to perform certain actions in a patch developer role. Under the patch developer role 510, the user will be allowed to apply certain predetermined patches to a composite. That is, predetermined types of patches can be applied to that will not affect the composite which is running. In a patch developer role, certain actions, editors or wizards can be disabled automatically in the pre-configured programming tool. Further, the pre-configured programming tool can only make changes based on predetermined compatible changes.

Therefore, in the patch developer role 510, the user can only perform actions for building and applying a compatible patch to a composite. Even though the pre-configured programming tool is capable of performing various actions, when the patch developer role is selected, the pre-configured programming tool is configured to perform activities directed to creating a patch.

After the user has selected the patching composite role in step 420, the user can then create the patch at step 430. If the user is creating the patch using a pre-configured programming tool, for example, JDeveloper, the pre-configured programming tool can be programmed so that only items which can be patched are identified.

The modifications to a composite, which are made in order to create a patch, are tracked in an artifact. The artifact can be called, for example, patch.xml. The artifact, which tracks the modifications, can act as an audit log of actions performed by a user in order to create a patch. The patch.xml file is, for example, a manifest that records the patch contents at the artifact level. It does not contain information about each of the specific actions performed by the user. The artifacts directed to patching a composite are saved and bundled. The artifacts are bundled to create a sparse patch archive. The sparse patch archive only includes artifacts directed to the patch and does not include all artifacts associated with the composite. Therefore, the sparse patch archive contains less information then the archive for the composite.

The sparse patch archive can be created through the prefigured programming tool, such as JDeveloper. Alternatively, the changes to the patch can be made in the prefigured programming tool, such as JDeveloper, and then the sparse patch archive can be creating using other tools, such as an Application Programming Interface (API) or a WebLogic Scripting Tool.

After the patch is created, it can then be deployed in the server.

Figure 6:
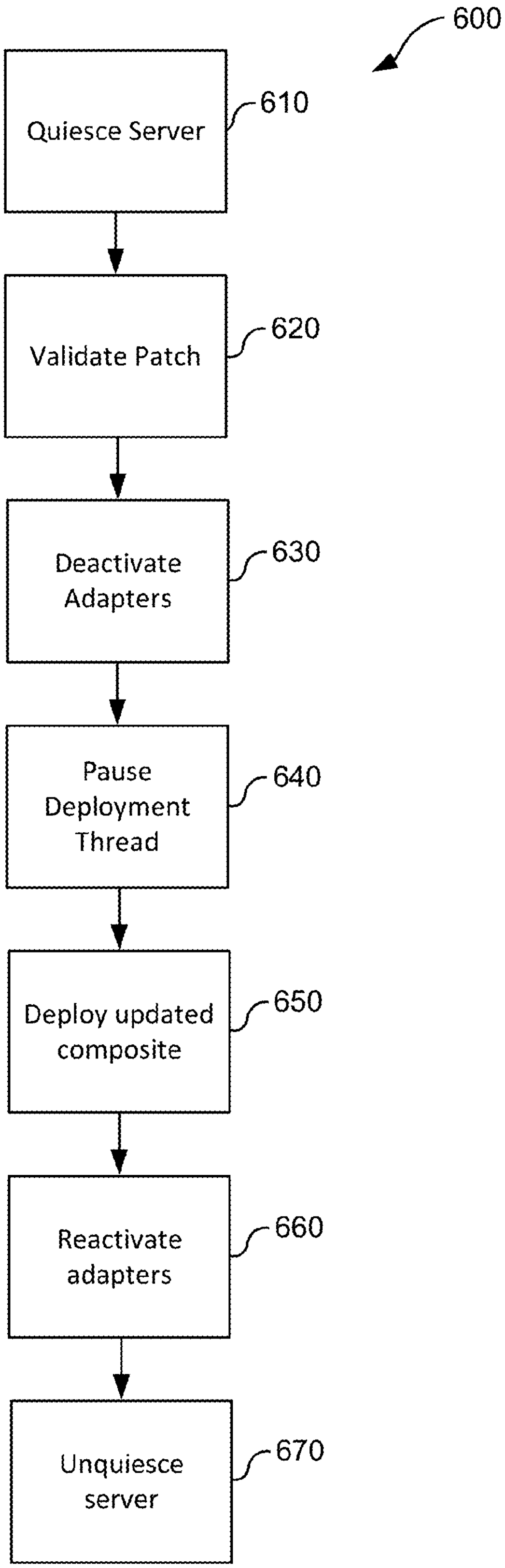
FIG. 6 is a flowchart of a method of applying a patch for a running composite, in accordance with some exemplary embodiments.

FIG. 6 is a flowchart of a method of applying a patch for a running composite, in accordance with some exemplary embodiments.

When a user is applying a patch, the system enters a patch mode. The server is programmed so that it is capable of applying a patch during the patch mode. Redeployment changes are made to the server logic so that the server recognizes that a patch is being applied. New metadata that is directed to performing a patch is uploaded to appropriate places in the server code. Therefore, any instances which are currently running in the server are capable of picking up the metadata changes. Further, aspects of the composite that the user did not change are maintained.

As shown in FIG. 6, at step 610 of the method 600, the server that is currently running the composite is quiesced. That is the server is quieted and instances that are currently running are quieted so that the changes instances can be applied. For example, the server can be suspended and the different service engines that are currently running instances of the composite can put the instances in a stable state. The composites can reach a stable state when the instances are in a dehydrated state. Therefore, the composites are at a stable point at which they can be resumed at a later point in time.

At step 620, the patch that was created can be validated. After the server is quiesced and the patch has been validated, at step 630 one or more adapters are deactivated. The one or more adapters, which can be the front ends to possibly external systems, can be put in a suspended state. That is the server is suspended for a temporary period of time until the metadata changes have been made.

At step 640, the deployment thread is paused. That is, the thread patch deployment thread is paused to allow sufficient time for all running instances to reach a dehydration state. At step 650, the patch can be deployed.

The patch can be validated and deployed using, for example, an Applicant Programming Interface (API), WebLogic Scripting Tool (WLST) or Another Neat Tool (ANT) script. The API can be a Java API. A Java API can be a Java interface that a user can call. Therefore, a set of methods can be provided to a user and the user can call the methods to invoke a certain functionality that has already been implemented. WLST is a command line scripting language. For example, there can be commands to create an archive, validate the patch and deploy the patch. ANT is a software building language.

Validating the patch can include determining whether the composite to be patched is running. If the composite that the user wants to apply the patch to is not currently running, then the user will be informed that a patch cannot be made as the composite is not running. Therefore, the user can create a patch through other mechanisms. If the composite is currently running, then it is determined that the patch can be compatible with the composite.

In performing the validation, the sparse archive would be inspected to ensure that the metadata in the sparse archive is valid. The sparse archive can be inspected by using, for example, a Java API. The API can be used to determine whether the composite the user desires to patch is running on the server.

An additional aspect of validating the patch is determining whether the changes are compatible with, for example, a service or a component type of the composite. Since the design time is disconnected from the run time, there may not be communication between the design time, where the patch was created in the preconfigured programming tool and the runtime, where the patch is deployed. By validating the patch, the system can determine that the changes made at design time are in sync with the system at runtime. The system determines that the changes made in design time are valid and are in sync with what is being performed at run time.

FIG. 7 illustrates the registration of patch compatibility validators used during a validation check, in accordance with some example embodiments. Specifically, FIG. 7 shows the spring.xml file that defines which "validators" are invoked as part of the validation step. As shown in FIG. 7, language 710 directed to the validation check can be included in the patch instructions so that validation can be performed before deploying the patch.

A programming tool, such as API, WLST, or ANT can be used to introduce the changes into the server's repository and apply the metadata changes to the runtime. The instances of the composite to be patched can then pick up the metadata changes.

The composite is located in the server. The changes to the metadata that are indicated in the patch are merged with the metadata of the existing version of the composite. The metadata of the composite is then updated. A composite application including metadata can be deployed in an SOA container. The SOA container interprets the metadata and processes the requests that are associated with the composite application. Deployment can include passing the application metadata to the SOA container so that the SOA container can interpret the metadata and process requests for that application. The SOA container uses, for example, metadata service (MDS). The MDS acts as an archive of metadata regarding composites that are currently running in the server.

When the patch is deployed in the server, the existing artifacts are retrieved from the MDS. The artifacts can then be updated and the changes can be applied. A new deployment archive, or set of artifacts for the composite can then be stored in the MDS. The new deployment archive will also be given a new label in the MDS to distinguish it from previous archives.

Instances of the composite, which are currently running, can pick up the new label and therefore, implement the changes to the composite. The instances can pick up the new label when they reach a point in their particular service engine where the service engine can read metadata. The composite that existed prior to the patch can be undeployed so that is it no longer running.

After the patch is deployed, the one or more adapters that were deactivated at step 620 can be reactivated at step 660. Therefore, the adapters can resume their activities and can, for example, pick up the changes and start processing new requests. A BPEL engine can rehydrate any suspended instances.

At step 670, the server can then be unquiesced. That is, the server can resume at its normal capacity.

Therefore, changes can be made while the composite is currently running and all of the instances of the composite that are currently running in the system can be patched. That it, any instances which are running can pick up the changes while they are running and can continue to run. Further, all of the changes or fixes are available immediately.

Figure 8:
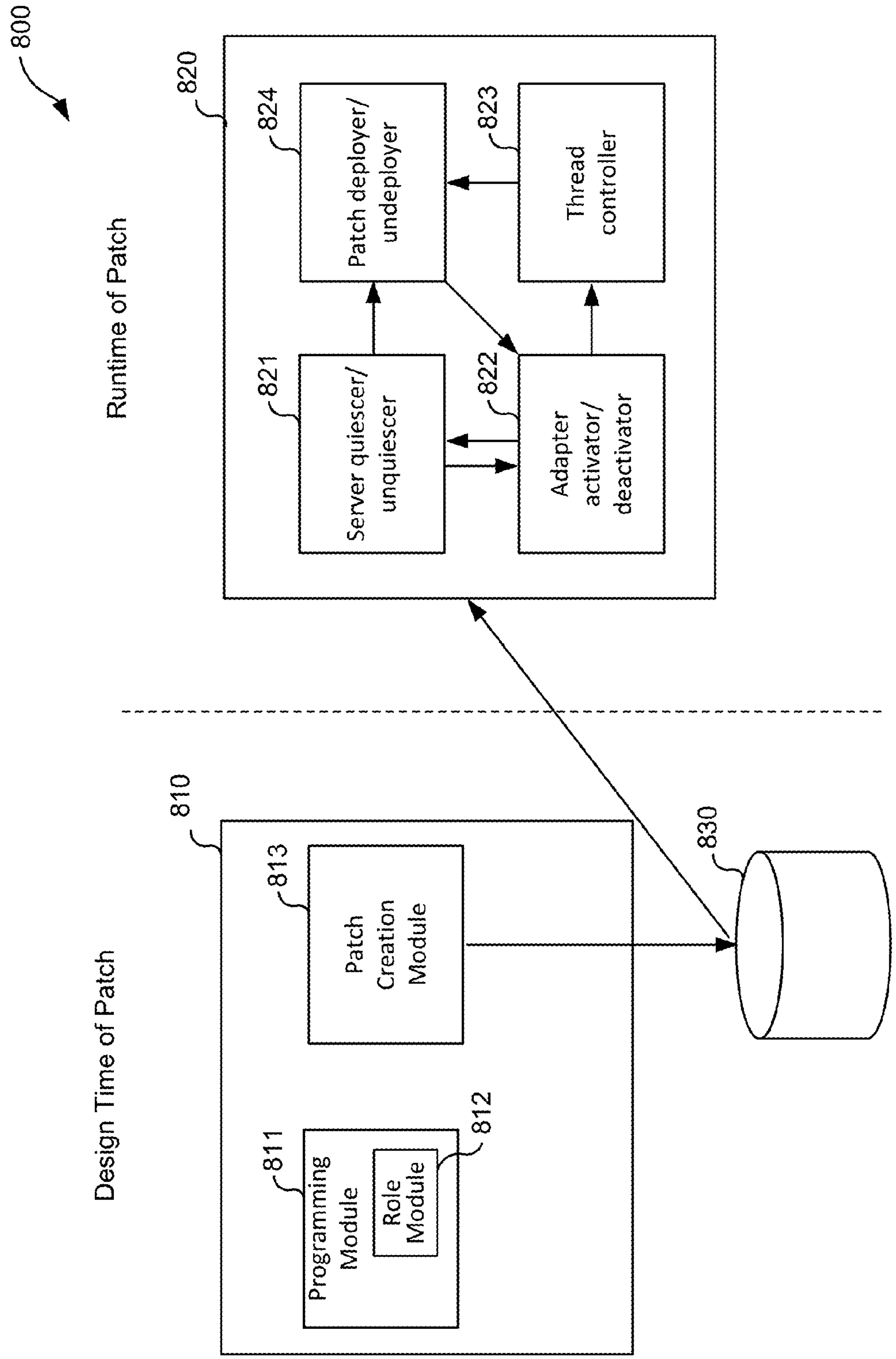
FIG. 8 illustrates a system for creating the patch and deploying the patch, in accordance with some exemplary embodiments.

FIG. 8 illustrates a system for creating the patch and deploying the patch, in accordance with some exemplary embodiments.

The system 800 can be implemented in a SOA container. As shown in FIG. 8, the system 800 includes a computer for operating a programming tool 810. The programming tool can be, for example, JDeveloper, and can be used to create a patch. The programming tool 810 includes a programming module 811 and a patch creation module 813. The programming module can include a role module 812.

A user can select the patch developer role using the role module 812 of the programming tool 810. The user can then create a patch using the patch creation module 813. After the user has created the patch, the patch can be stored in a database 830, such as database 240 of FIG. 2.

After the patch is created, the patch can be applied to a composite that is running in a server of a SOA container 820. The SOA container 820 can include a server quiescer/unquiescer 821, an adapter activator/deactivator 822, a thread controller 823, and a patch deployer/undeployer 824.

The server that is currently running the composite is quiesced by the server quiescer/unquiescer 821. After the server is quiesced, the adapter activator/deactivator 822 can deactivate one or more adapters. That is, the an adapter activator/deactivator 822 can deactivate all adapter services in the system. The thread controller 823 can pause the deployment thread. Therefore, deployment of a service, which is directed to the composite, is temporarily paused. The patch deployer/undeployer 824 can validate and deploy the patch. After the patch is validated and deployed, the adapter activator/deactivator 822 can reactivate the deactivated adapters. The server quiescer/unquiescer 821 can then unquiesce the server and the server can resume its normal operations.

The structure of the server and the programming tool have been configured so as to permit compatible changes to the composite. Therefore, changes can be made to one or more instances of a composite with zero downtime changes to the runtime environment.

V. Computer System

Figure 9:
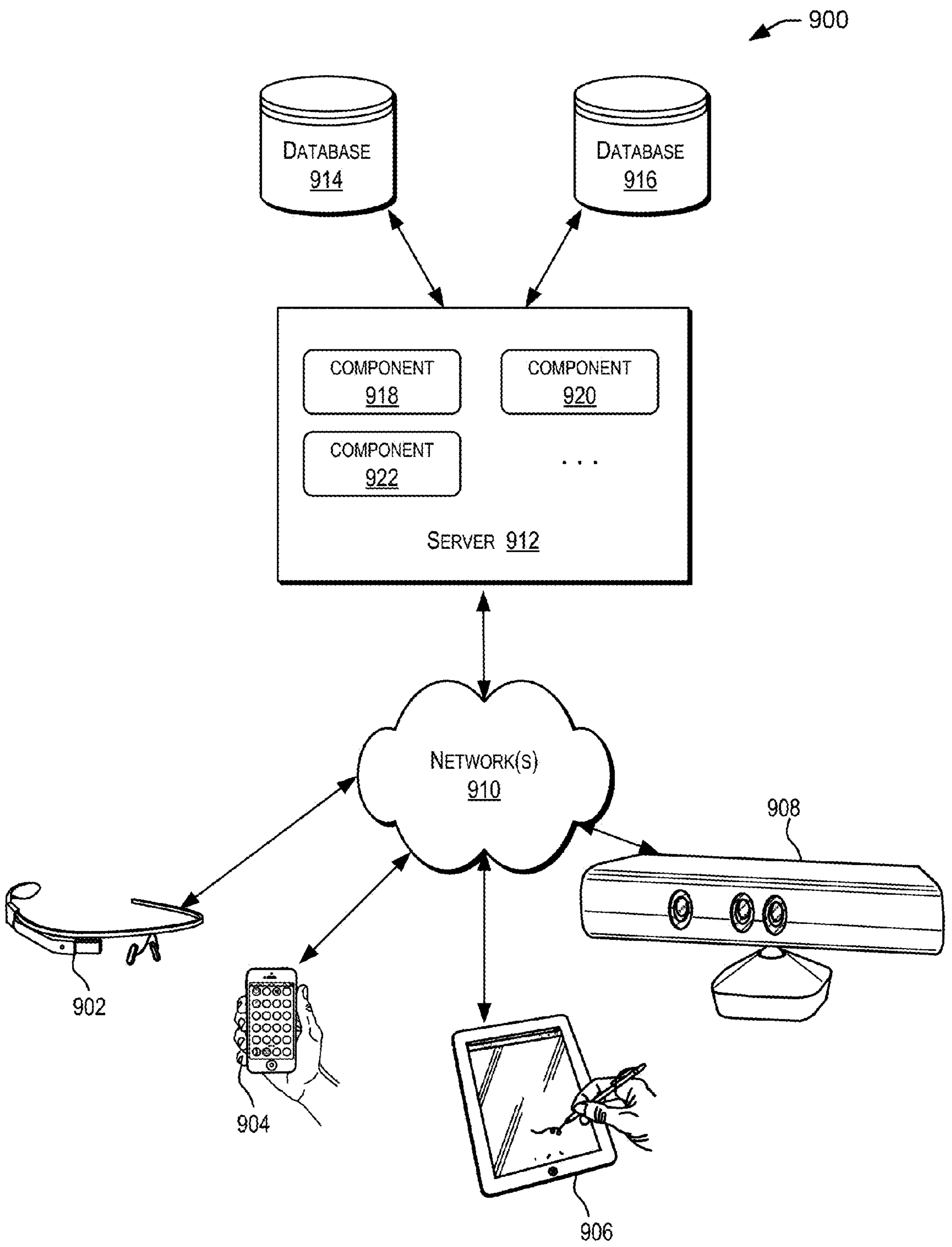
FIG. 9 illustrates a simplified diagram of a distributed system for implementing some exemplary embodiments.

FIG. 9 illustrates a simplified diagram of a distributed system 900 for implementing some exemplary embodiments. In the illustrated exemplary embodiment, the distributed system 900 includes one or more client computing devices 902, 904, 906, and 908, which are configured to execute and operate a client application such as a web browser, proprietary client, or the like over one or more network(s) 910. The server 912 may be communicatively coupled with the remote client computing devices 902, 904, 906, and 908 via network 910.

In various embodiments, the server 912 may be adapted to run one or more services or software applications such as services and applications that provide message delivery services. In certain embodiments, the server 912 may also provide other services or software applications can include non-virtual and virtual environments. In some embodiments, these services may be offered as web-based or cloud services or under a Software as a Service (SaaS) model to the users of the client computing devices 902, 904, 906, and/or 908. Users operating the client computing devices 902, 904, 906, and/or 908 may in turn utilize one or more client applications to interact with the server 912 to utilize the services provided by these components.

In the configuration depicted in FIG. 9, the software components 918, 920 and 922 of system 900 are shown as being implemented on the server 912. In other embodiments, one or more of the components of the system 900 and/or the services provided by these components may also be implemented by one or more of the client computing devices 902, 904, 906, and/or 908. Users operating the client computing devices may then utilize one or more client applications to use the services provided by these components. These components may be implemented in hardware, firmware, software, or combinations thereof. It should be appreciated that various different system configurations are possible, which may be different from distributed system 900. The embodiment shown in FIG. 9 is thus one example of a distributed system for implementing an embodiment system and is not intended to be limiting.

The client computing devices 902, 904, 906, and/or 908 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 910.

Although distributed system 900 in FIG. 9 is shown with four client computing devices, any number of client computing devices may be supported. Other devices, such as devices with sensors, etc., may interact with the server 912.

The network(s) 910 in the distributed system 900 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 910 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 912 can include one or more virtual machines running virtual operating systems, or other computing architectures involving virtualization. One or more flexible pools of logical storage devices can be virtualized to maintain virtual storage devices for the server. Virtual networks can be controlled by the server 912 using software defined networking. In various embodiments, the server 912 may be adapted to run one or more services or software applications described in the foregoing disclosure. For example, the server 912 may correspond to a server for performing processing as described above according to an embodiment of the present disclosure.

The server 912 may run an operating system including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, the server 912 may include one or more applications to analyze and consolidate data feeds and/or event updates received from users of the client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), click-stream analysis tools, automobile traffic monitoring, and the like. The server 912 may also include one or more applications to display the data feeds and/or real-time events via one or more display devices of the client computing devices 902, 904, 906, and 908.

The distributed system 900 may also include one or more databases 914 and 916. These databases may provide a mechanism for storing information such as inventory information, and other information used by the example embodiments. Databases 914 and 916 may reside in a variety of locations. By way of example, one or more of databases 914 and 916 may reside on a non-transitory storage medium local to (and/or resident in) the server 912. Alternatively, the databases 914 and 916 may be remote from the server 912 and in communication with the server 912 via a network-based or dedicated connection. In one set of embodiments, the databases 914 and 916 may reside in a storage-area network (SAN). Similarly, any necessary files for performing the functions attributed to the server 912 may be stored locally on the server 912 and/or remotely, as appropriate. In one set of embodiments, the databases 914 and 916 may include relational databases, such as databases provided by Oracle®, that are adapted to store, update, and retrieve data in response to SQL-formatted commands.

Figure 10:
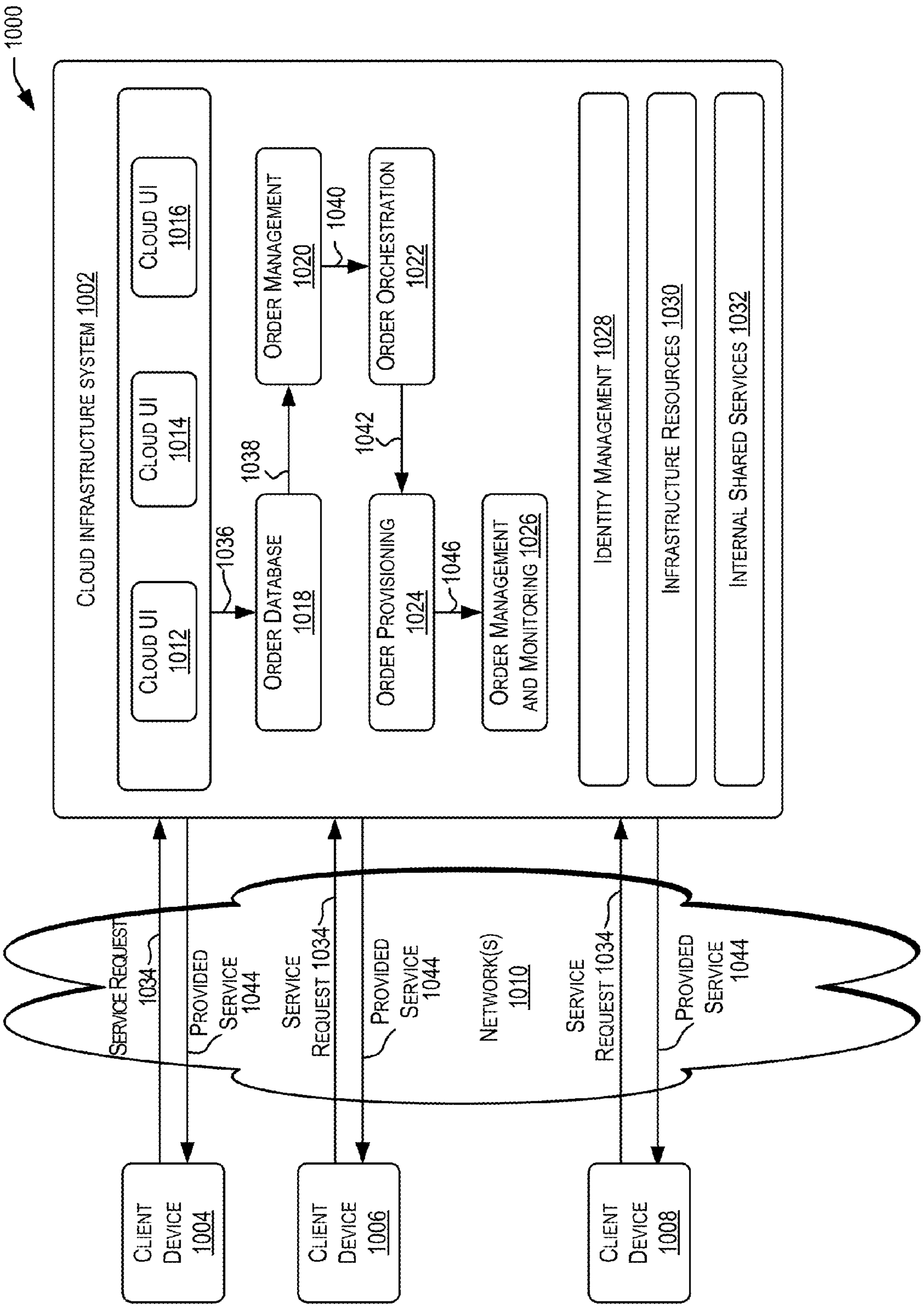
FIG. 10 illustrates a simplified block diagram of one or more elements of a system environment in which services may be offered as cloud services, in accordance with some exemplary embodiments.

FIG. 10 illustrates a simplified block diagram of one or more components of a system environment in which services may be offered as cloud services, in accordance with some exemplary embodiments.

In some embodiments, the message delivery services described above may be offered as services via a cloud environment. FIG. 10 illustrates a simplified block diagram of one or more components of a system environment 1000 in which services may be offered as cloud services, in accordance with an embodiment of the present disclosure. In the illustrated embodiment in FIG. 10, system environment 1000 includes one or more client computing devices 1004, 1006, and 1008 that may be used by users to interact with a cloud infrastructure system 1002 that provides cloud services, including services for dynamically modifying documents (e.g., webpages) responsive to usage patterns. Cloud infrastructure system 1002 may comprise one or more computers and/or servers.

It should be appreciated that cloud infrastructure system 1002 depicted in FIG. 10 may have other components than those depicted. Further, the embodiment shown in FIG. 10 is only one example of a cloud infrastructure system that may incorporate one or more of the example embodiments. In some other embodiments, cloud infrastructure system 1002 may have more or fewer components than shown in the figure, may combine two or more components, or may have a different configuration or arrangement of components.

Client computing devices 1004, 1006, and 1008 may be devices similar to those described above for 902, 904, 906, and 908. Client computing devices 1004, 1006, and 1008 may be configured to operate a client application such as a web browser, a proprietary client application (e.g., Oracle® Forms), or some other application, which may be used by a user of the client computing device to interact with cloud infrastructure system 1002 to use services provided by cloud infrastructure system 1002. Although exemplary system environment 1000 is shown with three client computing devices, any number of client computing devices may be supported. Other devices such as devices with sensors, etc. may interact with cloud infrastructure system 1002.

Network(s) 1010 may facilitate communications and exchange of data between clients 1004, 1006, and 1008 and cloud infrastructure system 1002. Each network may be any type of network familiar to those skilled in the art that can support data communications using any of a variety of commercially-available protocols, including those described above for network(s) 710.

In certain embodiments, services provided by cloud infrastructure system 1002 may include a host of services that are made available to users of the cloud infrastructure system on demand. In addition to services related to account management, various other services may also be offered including without limitation online data storage and backup solutions. Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 1002 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1002 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 1002 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 1002 may be adapted to automatically provision, manage and track a customer's subscription to services offered by cloud infrastructure system 1002. Cloud infrastructure system 1002 may provide the cloud services via different deployment models. For example, services may be provided under a public cloud model in which cloud infrastructure system 1002 is owned by an organization selling cloud services (e.g., owned by Oracle Corporation) and the services are made available to the general public or different industry enterprises. As another example, services may be provided under a private cloud model in which cloud infrastructure system 1002 is operated solely for a single organization and may provide services for one or more entities within the organization. The cloud services may also be provided under a community cloud model in which cloud infrastructure system 1002 and the services provided by cloud infrastructure system 1002 are shared by several organizations in a related community. The cloud services may also be provided under a hybrid cloud model, which is a combination of two or more different models.

In some embodiments, the services provided by cloud infrastructure system 1002 may include one or more services provided under Software as a Service (SaaS) category. Platform as a Service (PaaS) category, Infrastructure as a Service (IaaS) category, or other categories of services including hybrid services. A customer, via a subscription order, may order one or more services provided by cloud infrastructure system 1002. Cloud infrastructure system 1002 then performs processing to provide the services in the customer's subscription order.

In some embodiments, the services provided by cloud infrastructure system 1002 may include, without limitation, application services, platform services and infrastructure services. In some examples, application services may be provided b the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 1002 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 1002 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1002 may also include infrastructure resources 1030 for providing the resources used to provide various services to customers of the cloud infrastructure system. In one embodiment, infrastructure resources 1030 may include pre-integrated and optimized combinations of hardware, such as servers, storage, and networking resources to execute the services provided by the PaaS platform and the SaaS platform, and other resources.

In some embodiments, resources in cloud infrastructure system 1002 may be shared by multiple users and dynamically re-allocated per demand. Additionally, resources may be allocated to users in different time zones. For example, cloud infrastructure system 1002 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1032 may be provided that are shared by different components or modules of cloud infrastructure system 1002 to enable provision of services by cloud infrastructure system 1002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1002 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1002, and the like.

In one embodiment, as depicted in FIG. 10, cloud management functionality may be provided by one or more modules, such as an order management module 1020, an order orchestration module 1022, an order provisioning module 1024, an order management and monitoring module 1026, and an identity management module 1028. These modules may include or be provided using one or more computers and/or servers, which may be general purpose computers, specialized server computers, server farms, server clusters, or any other appropriate arrangement and/or combination.

In an exemplary operation, at 1034, a customer using a client device, such as client device 1004, 1006 or 1008, may interact with cloud infrastructure system 1002 by requesting one or more services provided by cloud infrastructure system 1002 and placing an order for a subscription for one or more services offered by cloud infrastructure system 1002. In certain embodiments, the customer may access a cloud User Interface (UI) such as cloud UI 1012, cloud UI 1014 and/or cloud UI 1016 and place a subscription order via these UIs. The order information received by cloud infrastructure system 1002 in response to the customer placing an order may include information identifying the customer and one or more services offered by the cloud infrastructure system 1002 that the customer intends to subscribe to.

At 1036, the order information received from the customer may be stored in an order database 1018. If this is a new order, a new record may be created for the order. In one embodiment, order database 1018 can be one of several databases operated by cloud infrastructure system 1018 and operated in conjunction with other system elements.

At 1038, the order information may be forwarded to an order management module 1020 that may be configured to perform billing and accounting functions related to the order, such as verifying the order, and upon verification, booking the order.

At 1040, information regarding the order may be communicated to an order orchestration module 1022 that is configured to orchestrate the provisioning of services and resources for the order placed by the customer. In some instances, order orchestration module 1022 may use the services of order provisioning module 1024 for the provisioning. In certain embodiments, order orchestration module 1022 enables the management of business processes associated with each order and applies business logic to determine whether an order should proceed to provisioning.

As shown in the embodiment depicted in FIG. 10, at 1042, upon receiving an order for a new subscription, order orchestration module 1022 sends a request to order provisioning module 1024 to allocate resources and configure resources needed to fulfill the subscription order. Order provisioning module 1024 enables the allocation of resources for the services ordered by the customer. Order provisioning module 1024 provides a level of abstraction between the cloud services provided by cloud infrastructure system 1000 and the physical implementation layer that is used to provision the resources for providing the requested services. This enables order orchestration module 1024 to be isolated from implementation details, such as whether or not services and resources are actually provisioned on the fly or pre-provisioned and only allocated/assigned upon request.

At 1044, once the services and resources are provisioned, a notification may be sent to the subscribing customers indicating that the requested service is now ready for use. In some instance, information (e.g. a link) may be sent to the customer that enables the customer to start using the requested services.

At 1046, a customer's subscription order may be managed and tracked by an order management and monitoring module 1026. In some instances, order management and monitoring module 1026 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 1000 may include an identity management module 1028 that is configured to provide identity services, such as access management and authorization services in cloud infrastructure system 1000. In some embodiments, identity management module 1028 may control information about customers who wish to utilize the services provided by cloud infrastructure system 1002. Such information can include information that authenticates the identities of such customers and information that describes which actions those customers are authorized to perform relative to various system resources (e.g., files, directories, applications, communication ports, memory segments, etc.) Identity management module 1028 may also include the management of descriptive information about each customer and about how and by whom that descriptive information can be accessed and modified.

Figure 11:
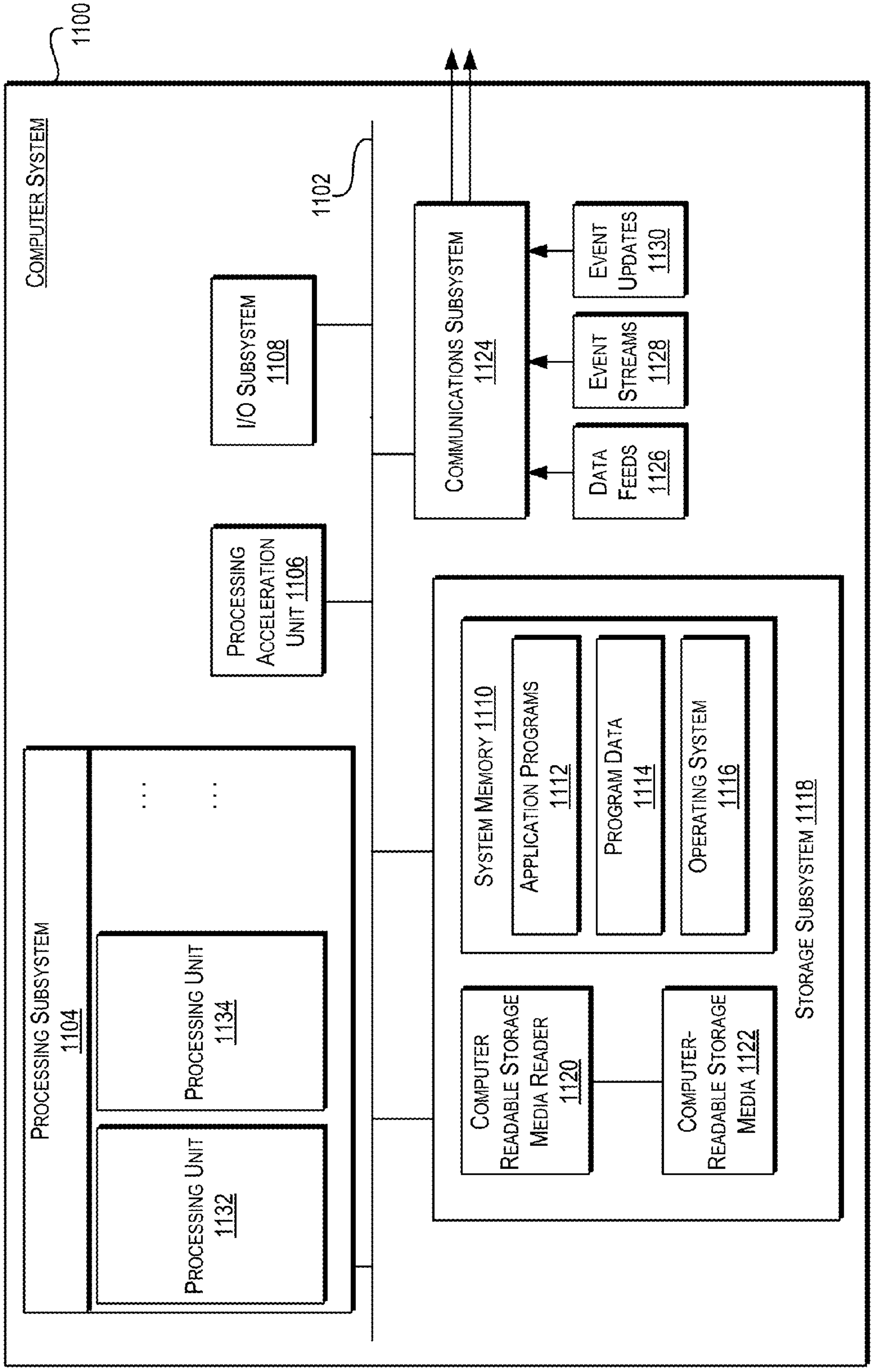
FIG. 11 illustrates an exemplary computer system that may be used to implement certain elements according to some exemplary embodiments.

FIG. 11 illustrates an exemplary computer system that may be used to implement certain components according to some exemplary embodiments.

FIG. 11 illustrates an exemplary computer system 1100 that may be used to implement some of the embodiments. In some embodiments, computer system 1100 may be used to implement any of the various servers and computer systems described above. As shown in FIG. 11, computer system 1100 includes various subsystems including a processing subsystem 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 may include tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1104 controls the operation of computer system 1100 and may comprise one or more processing units 1132, 1134, etc. A processing unit may include be one or more processors, including single core or multicore processors, one or more cores of processors, or combinations thereof. In some embodiments, processing subsystem 1104 can include one or more special purpose co-processors such as graphics processors, digital signal processors (DSPs), or the like. In some embodiments, some or all of the processing units of processing subsystem 1104 can be implemented using customized circuits, such as application specific integrated circuits (ASICs), or field programmable gate arrays (FPGAs).

In some embodiments, the processing units in processing subsystem 1104 can execute instructions stored in system memory 1110 or on computer readable storage media 1122. In various embodiments, the processing units can execute a variety of programs or code instructions and can maintain multiple concurrently executing programs or processes. At any given time, some or all of the program code to be executed can be resident in system memory 1110 and/or on computer-readable storage media 1110 including potentially on one or more storage devices. Through suitable programming, processing subsystem 1104 can provide various functionalities described above for dynamically modifying documents (e.g., webpages) responsive to usage patterns.

In certain embodiments, a processing acceleration unit 1106 may be provided for performing customized processing or for off-loading some of the processing performed by processing subsystem 1104 so as to accelerate the overall processing performed by computer system 1100.

I/O subsystem 1108 may include devices and mechanisms for inputting information to computer system 1100 and/or for outputting information from or via computer system 1100. In general, use of the term "input device" is intended to include all possible types of devices and mechanisms for inputting information to computer system 1100. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma. display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1118 provides a repository or data store for storing information that is used by computer system 1100. Storage subsystem 1118 provides a tangible non-transitory computer-readable storage medium for storing the basic programming and data constructs that provide the functionality of some embodiments. Software (programs, code modules, instructions) that when executed by processing subsystem 1104 provide the functionality described above may be stored in storage subsystem 1118. The software may be executed by one or more processing units of processing subsystem 1104. Storage subsystem 1118 may also provide a repository for storing data used in accordance with some embodiments.

Storage subsystem 1118 may include one or more non-transitory memory devices, including volatile and non-volatile memory devices. As shown in FIG. 11, storage subsystem 1118 includes a system memory 1110 and a computer-readable storage media 1122. System memory 1110 may include a number of memories including a volatile main random access memory (RAM) for storage of instructions and data during program execution and a non-volatile read only memory (ROM) or flash memory in which fixed instructions are stored. In some implementations, abasic input/output system (BIOS), containing the basic routines that help to transfer information between elements within computer system 1100, such as during start-up, may typically be stored in the ROM. The RAM typically contains data and/or program modules that are presently being operated and executed by processing subsystem 1104. In some implementations, system memory 1110 may include multiple different types of memory, such as static random access memory (SRAM) or dynamic random access memory (DRAM).

By way of example, and not limitation, as depicted in FIG. 11, system memory 1110 may store application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1122 may store programming and data constructs that provide the functionality of some embodiments. Software (programs, code modules, instructions) that when executed by processing subsystem 1104 a processor provide the functionality described above may be stored in storage subsystem 1118. By way of example, computer-readable storage media 1122 may include non-volatile memory such as a hard disk drive, a magnetic disk drive, an optical disk drive such as a CD ROM, DVD, a Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1122 may provide storage of computer-readable instructions, data structures, program modules, and other data for computer system 1100.

In certain embodiments, storage subsystem 1118 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for storing computer-readable information.

In certain embodiments, computer system 1100 may provide support for executing one or more virtual machines. Computer system 1100 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1100. Accordingly, multiple operating systems may potentially be run concurrently by computer system 1100. Each virtual machine generally runs independently of the other virtual machines.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to establish a communication channel to one or more client devices via the Internet for receiving and sending information from and to the client devices.

Communication subsystem 1124 may support both wired and/or wireless communication protocols. For example, in certain embodiments, communications subsystem 1124 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

Communication subsystem 1124 can receive and transmit data in various forms. For example, in some embodiments, communications subsystem 1124 may receive input communication in the form of structured and/or unstructured data feeds 1126, event streams 1128, event updates 1130, and the like. For example, communications subsystem 1124 may be configured to receive (or send) data feeds 1126 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1124 may be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1100 depicted in FIG. 11 is intended only as a specific example. Many other configurations having more or fewer components than the system depicted in FIG. 11 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the example embodiments. The exemplary embodiments are not restricted to operation within certain specific data processing environments, but are free to operate within a plurality of data processing environments. Additionally, although embodiments have been described using a particular series of transactions and steps, it should be apparent to those skilled in the art that the scope of the example embodiments are not limited to the described series of transactions and steps. Various features and aspects of the above-described embodiments may be used individually or jointly.

Further, while some embodiments have been described using a particular combination of hardware and software, it should be recognized that other combinations of hardware and software are also within the scope of the example embodiments. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although example embodiments have been described, these are not intended to be limiting. Various modifications and equivalents are within the scope of the following claims.

What is claimed is:

1. A method comprising:

at a computer system comprising a processor and a memory:

executing, by an application server, one or more instances of a composite for a business process execution language (BPEL) process, wherein the composite is an assembly of one or more services configured as an entry point for the composite, one or more components comprising logic for the composite, and one or more references linked to the one or more services, wherein the BPEL process is configured to provide process orchestration and storage of one of a synchronous and an asynchronous process;

receiving a request to apply a change to the composite;

determining whether the change to the composite is compatible with the composite;

creating a patch to implement the change using one of a pre-configured programming tool and a user designated programming tool; and enabling the patch to be applied to the one or more instances of the composite for the BPEL process without stopping execution of the one or more instances in the application server, wherein the patch comprises one or more changes to be made to the composite, wherein the patch is directed to metadata that is determined to be compatible with the composite according to a predetermined filtering document, and wherein the predetermined filtering document comprises an extensible stylesheet language transformation (XSLT) document.

2. The method of claim 1, further comprising:

executing, by a design system, a tool configured to create the patch for the composite, wherein the tool provides a user with a plurality of programming roles and in response to the user selecting a patch developer role of the plurality of programming roles, allows the user to create the patch.

3. The method of claim 1, wherein the one or more changes comprises one or more changes to an application logic of the composite that is configured to change a result of the composite.

4. The method of claim 1, wherein the one or more changes are directed to a transient state of metadata in the BPEL process composite.

5. The method of claim 1, wherein the application server is configured to provide an environment for deploying and running an application and is for a service-oriented architecture (SOA) container.

6. The method of claim 1, further comprising validating the one or more changes to the composite before enabling the patch to be applied.

7. The method of claim 1, further comprising:

quiescing the application server before enabling the patch to be applied; and unquiescing the application server after enabling the patch to be applied.

8. The method according to claim 1, wherein the one or more services is configured as an entry point to the composite, wherein the one or more components provide logic used within the composite, and wherein the one or more references comprise one of a JAVA interface, a WSDL Port Type, and a web service.

9. The method according to claim 1, wherein the assembly of one or more services, one or more components, and one or more references of the composite are designed and deployed in a single composite application.

10. The method according to claim 1, wherein the composite is an application written in accordance with a service component architecture (SCA) specification.

11. The method according to claim 1, wherein the BPEL process is further configured to provide at least one of a business rule that enables a user to design a business decision, a human task which provides a workflow model describing a task for the user to perform for a business process flow, and mediator which routes messages between components.

12. A non-transitory computer-readable memory comprising a set of instructions stored therein which, when executed by a processor, causes the processor to:

execute one or more instances of a composite for a business process execution language (BPEL) process in an application server, wherein the composite is an assembly of one or more services configured as an entry point for the composite, one or more components comprising logic for the composite, and one or more references linked to the one or more services, wherein the BPEL process is configured to provide process orchestration and storage of one of a synchronous and an asynchronous process;

receive a request to apply a change to the composite;

determine whether the change to the composite is compatible with the composite;

create a patch to implement the change using one of a pre-configured programming tool and a user designated programming tool; and enable the patch to be applied to the one or more instances of the composite for the BPEL process without stopping execution of the one or more instances in the application server, wherein the patch comprises one or more changes to be made to the composite, wherein the patch is directed to metadata that is determined to be compatible with the composite according to a predetermined filtering document, and wherein the predetermined filtering document comprises an extensible stylesheet language transformation (XSLT) document.

13. The computer-readable memory of claim 12, further causing the processor to:

execute a tool configured to create the patch for the composite, and wherein the tool provides a user with a plurality of programming roles and in response to the user selecting a patch developer role of the plurality of programming roles, allows the user to create the patch.

14. The computer-readable memory of claim 12, wherein the one or more changes comprises one or more changes to an application logic of the composite that is configured to change a result of the composite.

15. The computer-readable memory of claim 12, wherein the application server is configured to provide an environment for deploying and running an application and is for a service-oriented architecture (SOA) container.

16. A system comprising:

a processor;

a memory; and a server configured to:

execute one or more instances of a composite for a business process execution language (BPEL) process, wherein the composite is an assembly of one or more services configured as an entry point for the composite, one or more components comprising logic for the composite, and one or more references linked to the one or more services, wherein the BPEL process is configured to provide process orchestration and storage of one of a synchronous and an asynchronous process;

receive a request to apply a change to the composite;

determine whether the change to the composite is compatible with the composite;

create a patch to implement the change using one of a pre-configured programming tool and a user designated programming tool; and enable the patch to be applied to the one or more instances of the composite for the BPEL process without stopping execution of the one or more instances, wherein the patch comprises one or more changes to be made to the composite, wherein the patch is directed to metadata that is determined to be compatible with the composite according to a predetermined filtering document, and wherein the predetermined filtering document comprises an extensible stylesheet language transformation (XSLT) document.

17. The system of claim 16, further comprising:

a design system configured to execute a tool to create the patch for the composite, wherein the tool provides a user with a plurality of programming roles and in response to the user selecting a patch developer role of the plurality of programming roles, allows the user to create the patch.

18. The system of claim 16, wherein the one or more changes comprises one or more changes to an application logic of the composite that is configured to change a result of the composite.

19. The system of claim 16, wherein the server is for a service-oriented architecture (SOA) container.

20. The system of claim 16, wherein the server validates the one or more changes to the composite before enabling the patch to be applied.

21. The system of claim 16, wherein the server is a WebLogic server.

* * * * *

UNITED STATES PATENT AND TRADEMARK OFFICE
CERTIFICATE OF CORRECTION

PATENT NO. : 10,303,461 B2
APPLICATION NO. : 15/268408
DATED : May 28, 2019
INVENTOR(S) : Fuglsang et al.

Page 1 of 1

It is certified that error appears in the above-identified patent and that said Letters Patent is hereby corrected as shown below:

In the Specification

In Column 13, Line 35, delete "the an" and insert -- the --, therefor.

In Column 18, Line 6, delete "category." and insert -- category, --, therefor.

In Column 18, Line 19, delete "b" and insert -- by --, therefor.

In Column 23, Line 10, delete "abasic" and insert -- a basic --, therefor.

Signed and Sealed this
Twenty-eighth Day of July, 2020

Andrei Iancu
*Director of the United States Patent and Trademark Office*